United States Patent [19]

Morehead

[11] 4,332,099
[45] Jun. 1, 1982

[54] CAT CATCHER (FISHING DEVICE)

[76] Inventor: Enoch W. Morehead, 600 Robinson Ter., Texarkana, Tex. 75501

[21] Appl. No.: 183,082

[22] Filed: Sep. 2, 1980

[51] Int. Cl.³ .............................................. A01K 91/06
[52] U.S. Cl. .................................................... 43/15
[58] Field of Search ...................................... 43/15, 16

[56] References Cited

U.S. PATENT DOCUMENTS

| | | | |
|---|---|---|---|
| 2,799,111 | 7/1957 | Voboril | 43/15 |
| 2,810,981 | 10/1957 | Littau | 43/16 |
| 2,851,812 | 9/1959 | Beck | 43/15 |
| 2,984,039 | 5/1961 | Willey | 43/15 |
| 3,686,785 | 8/1972 | Dixon | 43/15 |
| 3,867,779 | 2/1975 | McMaster | 43/15 |
| 3,943,650 | 3/1976 | Johansson | 43/15 |
| 4,091,558 | 5/1978 | Dethlefs | 43/15 |

Primary Examiner—Nicholas P. Godici

[57] ABSTRACT

A device for supporting an unattended fishing rod while fishing; the device including a tripping mechanism activated by a fish nibbling at the bait, so as to jerk the line and thus securely hook the fish, the device also including a holder insertable into the ground, the holder supporting the fishing rod handle.

1 Claim, 4 Drawing Figures

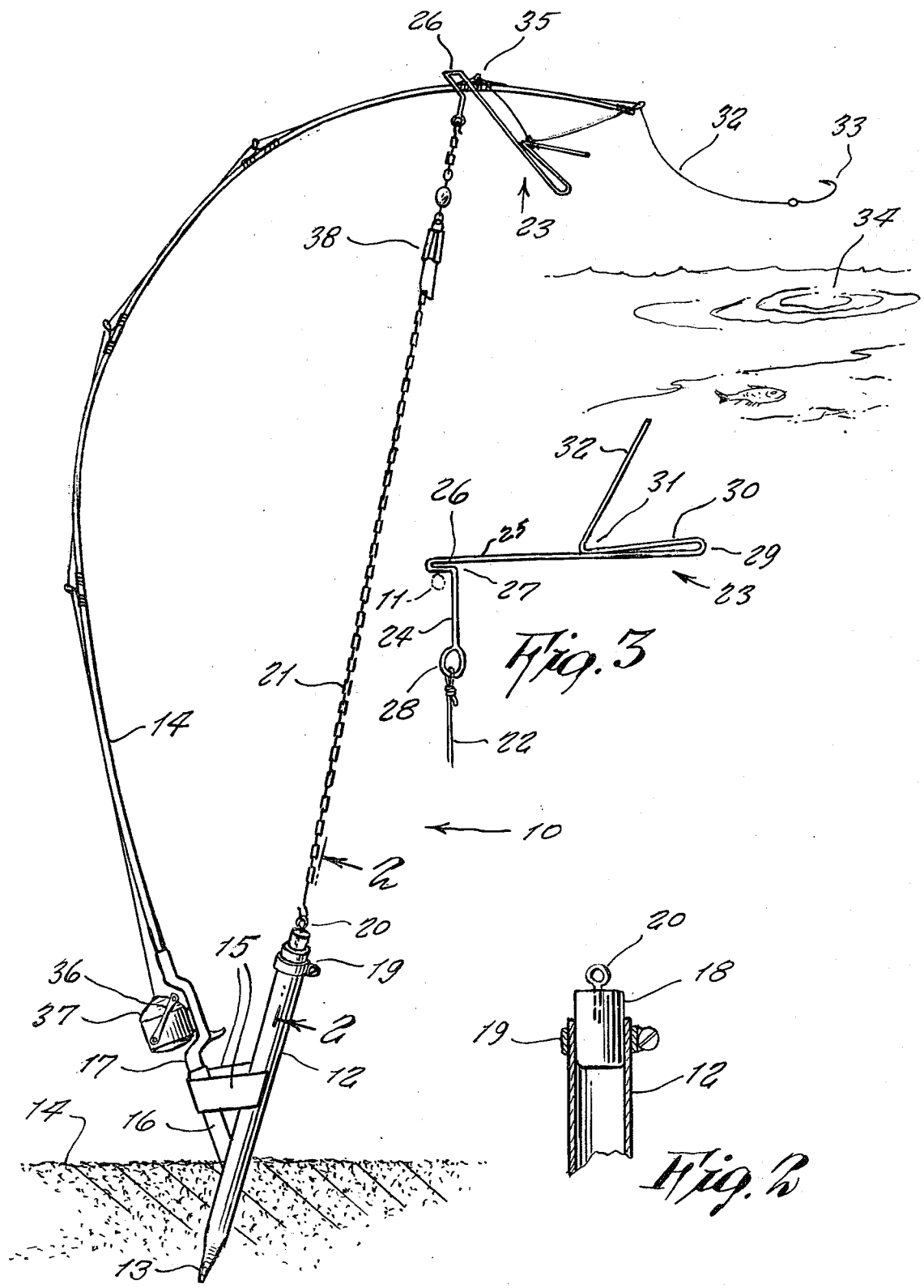

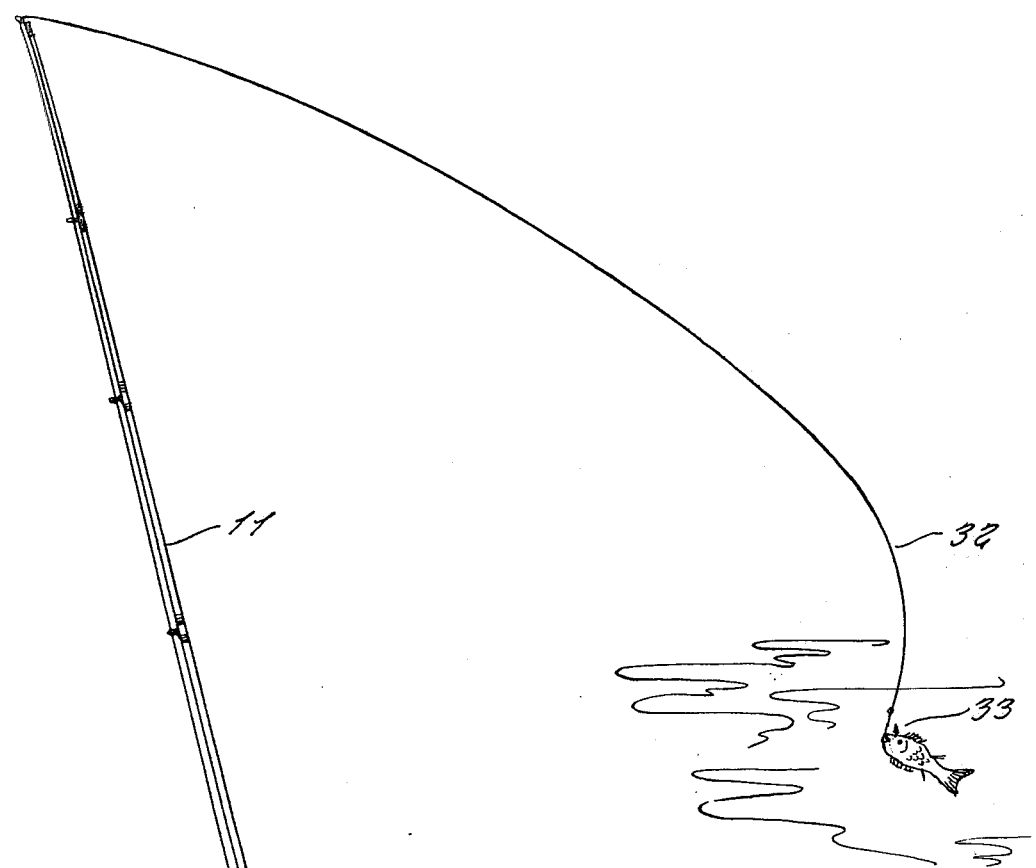
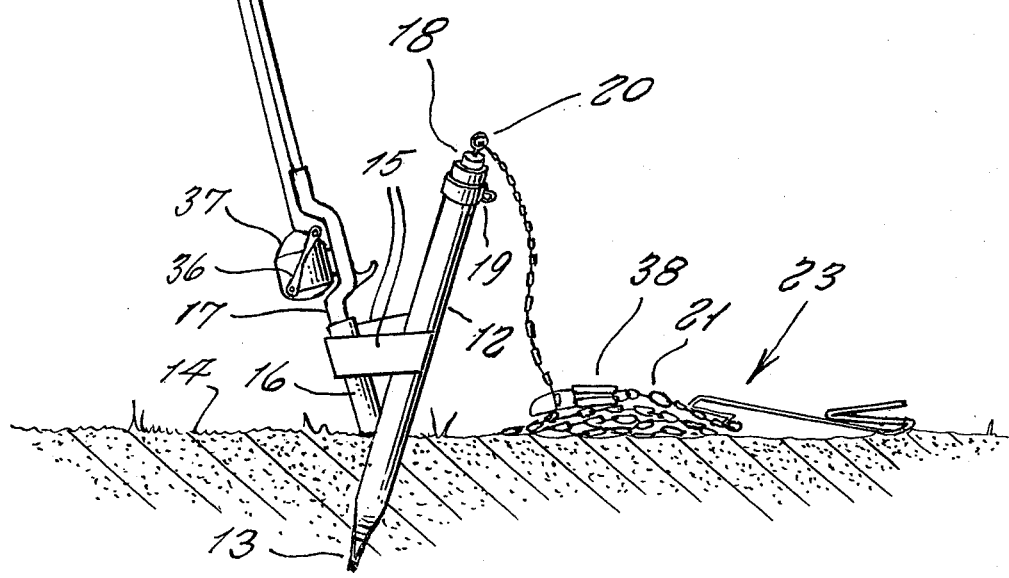
Fig. 4

CAT CATCHER (FISHING DEVICE)

This invention relates generally to fishing accessories for sports fishermen.

It is well known, that sometimes a fisherman wishes to have several fishing lines in use at the same time, so that he must set them up in a self-supporting manner, and he then attends to any such one of them having a fish nibbling at its bait. This requires a careful watching of all lines, in order to jerk quickly any such line, and thus hook the nibbling fish.

A principal object of the present invention is to provide a fishing device, on which a fishing rod can be installed, the device including a mechanism that automatically trips when a fish nibbles at the bait, and the tripped mechanism causes the hook to be jerked quickly in order to impale the fish thereupon, thus eliminating the close attention of a fisherman to do the same quickly.

Another object of this invention is to provide a fishing device, which can be used easily, also, by seated, handicapped fishermen, who cannot move quickly, or by anyone else, including women or youngsters.

Other objects of the present invention are to provide a fishing device, which is simple in design, inexpensive to manufacture, rugged in construction, easy to use and efficient in operation.

These, and other objects, will be readily evident upon a study of the following specification and the accompanying drawing wherein:

FIG. 1 is a side view of the invention installed on a fishing rod, and shown in operative use, so as to positively hook a fish that pulls on the line bait;

FIG. 2 is an enlarged fragmentary cross-sectional view, taken on line 2—2 of FIG. 1;

FIG. 3 is a side view of the hook and showing a nylon cord tether instead of a chain; and FIG. 4 is a side elevation view of the fishing rod after being released, and the fish being caught on the hook.

Referring now to the drawing in greater detail, the reference numeral 10 represents a cat catcher fishing device, according to the present invention, for supporting a fishing rod 11 while fishing. The device includes a post 12, made from a five-eighths inch diameter metal tube, measuring twenty inches in length, one end 13 thereof being flattened, in order to be driven into the ground 14. A brace 15, along each side of the post at the center thereof, serves to extend around a side of a receptacle or holder 16, into which a handle 17 of the fishing rod may be inserted.

The upper end of the tubular holder is fitted with a plug or wooden core 18, that is secured therein by means of a hose-type clamp 19, around the outer side of the tubular end, which may be split, so that it may be tightened around the core. An eye screw 20 is secured to the outer end of the core, and one end of either a thirty-four inches long, small linked chain 21 or nylon cord 22 is secured thereto, as shown in FIGS. 1 and 3 respectively.

The present invention also includes a triggering device 23, attached on an opposite end of the chain or nylon cord, and which serves to hook around a side of an outward portion of the fishing rod, and hold the fishing rod in a forcibly arched or bowed condition, as shown in FIG. 1. The triggering device comprises a stiff wire, bent permanently into the shape illustrated in FIG. 3, and including legs 24 and 25, at right angles to each other. An offset 26, at a junction 27 of the sides, is parallel to one side 25. An end of the leg 24 has a loop 28, to which the chain or nylon cord is connected. A one hundred and eighty degree bend 29, at an end of the leg 25, is integral with a terminal leg 30, that rests alongside the leg 25, and has an acute bend 31, so as to form a terminal spur 32 extending angularly outward from the bend 31.

In use of the fishing device, the post is inserted in the ground. The end of the fishing line 32, with baited hook 33, is cast out into the water 34, at a desired fishing spot. The rod handle is placed into the holder, and the rod is then forwardly flexed over into a bow shape, as shown. The offset 26 of the tripping device is then fitted over the rod, just behind the second eyelet 35 of the rod. The rod is then released from the hand, and is held in bowed condition by the chain or nylon cord. The fishing line between the first and second eyelet is then hooked behind the spur 32, and the slack in the line is reeled in by a crank 36 on the line reel 37.

When a fish takes the bait, and tugs on the line, the tripping device moves forward, and turns the offset, so as to disengage from the rod, thus allowing the rod outer end to flip upwardly as the released rod straightens out, as shown in FIG. 4. This causes the line to jerk the hook, so as to imbed in the fish's mouth.

A swivel 38 with snap, along the chain or nylon cord, allows adjustment for rods from four and one-half to six feet in length.

While various changes may be made in the detail construction, it is understood that such changes will be within the spirit and scope of the present invention, as is defined by the appended claims.

What I now claim is:

1. A cat catcher fishing device, comprising, in combination, a tubular post, a lower end of said post being flattened for easy insertion into the ground, a holder for a fishing rod handle being angularly secured to a side of said post by means of braces therebetween, a plug-like core inserted in the top of said post, a hose-type clamp around said post securing said core inside said post, a tethering line secured at its one end to said core, and a triggering device attached to an opposite end of said tethering line; said triggering device comprising a stiff wire bent into a straight first leg and a straight second leg at right angles to each other, a loop on an outer end of said first leg for securement to said tethering line; a double U-shaped bend at a junction of said legs forming a relatively short extension and offset of said second leg; a one hundred and eighty degree bend at an opposite outer end of said second leg, and a short terminal leg formed at an end of said outer bend being generally parallel to said second leg, a terminal spur formed on an end of said terminal leg extending angularly therefrom.

* * * * *